(12) United States Patent
Oh et al.

(10) Patent No.: US 10,239,528 B2
(45) Date of Patent: Mar. 26, 2019

(54) VEHICLE AND METHOD OF CONTROLLING THE VEHICLE

(71) Applicant: Hyundai Motor Company, Seoul (KR)

(72) Inventors: Youngchul Oh, Gyeonggi-do (KR);
Kicheol Shin, Gyeonggi-do (KR);
Byungyong You, Gyeonggi-do (KR);
MyungSeon Heo, Seoul (KR)

(73) Assignee: Hyundai Motor Company, Seoul (KR)

( * ) Notice: Subject to any disclaimer, the term of this patent is extended or adjusted under 35 U.S.C. 154(b) by 276 days.

(21) Appl. No.: 15/092,137

(22) Filed: Apr. 6, 2016

(65) Prior Publication Data

US 2017/0183007 A1    Jun. 29, 2017

(30) Foreign Application Priority Data

Dec. 28, 2015  (KR) ......................... 10-2015-0187500

(51) Int. Cl.
*B60W 30/16*  (2012.01)
*G05D 1/00*  (2006.01)
*G05D 1/02*  (2006.01)

(52) U.S. Cl.
CPC ........... *B60W 30/16* (2013.01); *G05D 1/0231* (2013.01); *B60W 2510/20* (2013.01); *B60W 2520/10* (2013.01); *G05D 2201/0213* (2013.01)

(58) Field of Classification Search
CPC ............ B60W 30/16; B60W 2510/20; B60W 2520/10; G05D 1/0231; G05D 2201/0213
USPC .......................................................... 701/28
See application file for complete search history.

(56) References Cited

U.S. PATENT DOCUMENTS

| | | | |
|---|---|---|---|
| 6,842,687 B2 * | 1/2005 | Winner | B60K 31/0008 180/169 |
| 9,783,201 B2 * | 10/2017 | Heinrich | B60W 30/18163 |
| 9,877,023 B2 * | 1/2018 | Chong | H04N 19/117 |
| 2003/0153239 A1 * | 8/2003 | Kownacki | A63H 17/00 446/180 |
| 2008/0087545 A1 | 4/2008 | Jensen et al. | |
| 2011/0196592 A1 * | 8/2011 | Kashi | B60W 30/16 701/96 |
| 2013/0141251 A1 * | 6/2013 | Sims | B60Q 9/008 340/905 |
| 2015/0006028 A1 * | 1/2015 | Strauss | B62D 1/28 701/36 |

(Continued)

FOREIGN PATENT DOCUMENTS

JP    2004-220348 A    8/2004
JP    2004220348 A  *  8/2004

(Continued)

*Primary Examiner* — Marthe Y Marc-Coleman
(74) *Attorney, Agent, or Firm* — Mintz Levin Cohn Ferris Glovsky and Popeo, P.C.; Peter F. Corless

(57) ABSTRACT

A vehicle includes: a processor configured to calculate a direction in which the vehicle is to move in order to overtake a preceding vehicle and calculate a distance to the preceding vehicle when it is determined that the preceding vehicle is travelling abnormally; a distance sensor configured to recognize a lane located in the calculated direction in which the vehicle is to move based on the calculated distance to the preceding vehicle; and a driving apparatus configured to control driving of the vehicle in a manner which keeps the vehicle at or near the calculated distance to the preceding vehicle.

14 Claims, 9 Drawing Sheets

(56) References Cited

U.S. PATENT DOCUMENTS

| | | | | |
|---|---|---|---|---|
| 2015/0194055 A1* | 7/2015 | Maass | ............... | B60W 50/14 |
| | | | | 340/905 |
| 2015/0353094 A1* | 12/2015 | Harda | ............. | B60W 30/18163 |
| | | | | 701/23 |
| 2015/0360721 A1* | 12/2015 | Matsuno | ............ | B62D 15/0255 |
| | | | | 701/41 |
| 2016/0114811 A1* | 4/2016 | Matsuno | ........... | B60W 50/0225 |
| | | | | 701/23 |
| 2016/0159350 A1* | 6/2016 | Pilutti | ................ | B60W 30/143 |
| | | | | 701/23 |

FOREIGN PATENT DOCUMENTS

| | | | |
|---|---|---|---|
| JP | 2006205862 A | | 8/2006 |
| JP | 2006349456 A | | 12/2006 |
| JP | 2007295357 A | | 11/2007 |
| JP | 2008087545 A | * | 4/2008 |
| JP | 2010-271750 A | | 12/2010 |
| JP | 2010271750 A | * | 12/2010 |
| JP | 2014-061792 A | | 4/2014 |
| JP | 2014061792 A | * | 4/2014 |
| JP | 2014-180986 A | | 9/2014 |
| JP | 2014180986 A | * | 9/2014 |
| KR | 2005-0101711 A | | 10/2005 |
| KR | 10-2009-0062526 A | | 6/2009 |

* cited by examiner

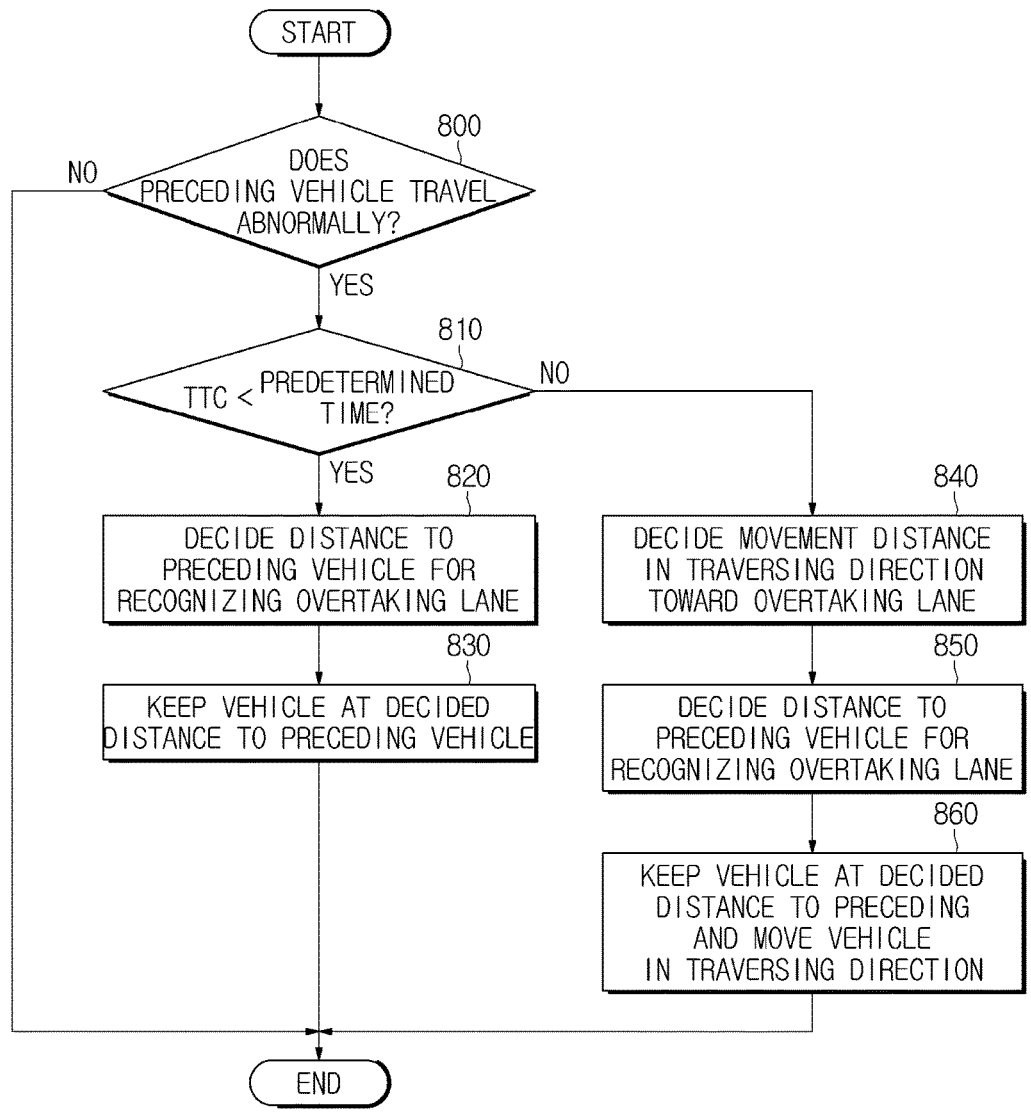

VEHICLE AND METHOD OF CONTROLLING THE VEHICLE

CROSS-REFERENCE TO RELATED APPLICATION

This application claims the benefit of and priority to Korean Patent Application No. 10-2015-0187500, filed on Dec. 28, 2015 in the Korean Intellectual Property Office, the disclosure of which is hereby incorporated herein by reference in its entirety.

BACKGROUND

1. Technical Field

Embodiments of the present disclosure relate generally to a vehicle and, more particularly, to a vehicle that can control driving in an advancing direction or in a traversing direction to enable a distance sensor to recognize an overtaking lane.

2. Description of the Related Art

In general, driving assist apparatuses can provide a function of assisting driving in an advancing direction of a vehicle (e.g., Adaptive Cruise Control (ACC)), or a function of assisting driving in a traversing direction of a vehicle (e.g., Lane Departure Warning System (LDWS) or Lane Keeping Assist System (LKAS)). Along these lines, autonomous driving vehicles that can be automatically controlled in the advancing/traversing direction without a driver's intervention have been in development.

SUMMARY

It is an aspect of the present disclosure to provide a vehicle that can control driving in an advancing direction or in a traversing direction to enable a distance sensor to recognize an overtaking lane, in order to overtake a preceding vehicle when the preceding vehicle travels abnormally, and a method of controlling the vehicle. Additional aspects of the disclosure will be set forth in part in the description which follows and, in part, will be apparent from the description, or may be learned by practice of the disclosure.

In accordance with embodiments of the present disclosure, a vehicle includes: a processor configured to calculate a direction in which the vehicle is to move in order to overtake a preceding vehicle and calculate a distance to the preceding vehicle when it is determined that the preceding vehicle is travelling abnormally; a distance sensor configured to recognize a lane located in the calculated direction in which the vehicle is to move based on the calculated distance to the preceding vehicle; and a driving apparatus configured to control driving of the vehicle in a manner which keeps the vehicle at or near the calculated distance to the preceding vehicle.

The processor may be further configured to calculated a movement distance of the vehicle in the calculated direction in a lane on which the vehicle is currently travelling, and the distance sensor may be further configured to recognize the lane located in the calculated direction based further on the calculated movement distance.

The driving apparatus may be further configured to control driving of the vehicle according to the calculated movement distance.

The processor may be further configured to calculate the movement distance of the vehicle when a time until the vehicle collides with a rear vehicle traveling on the lane located in the calculated direction is longer than or equal to a predetermined time.

The processor may be further configured to calculate the distance to the preceding vehicle when a time until the vehicle collides with a rear vehicle traveling on the lane located in the calculated direction is less than a predetermined time.

The vehicle may further include an image sensor configured to acquire an image of surroundings of the vehicle. The processor may be further configured to calculate a distance between a lane line and a traveling trajectory of the preceding vehicle or a rate of change of acceleration of the preceding vehicle, based on information acquired by at least one of the distance sensor and the image sensor and determine whether the preceding vehicle is travelling abnormally based on the calculated distance between the lane line and the traveling trajectory of the preceding vehicle or rate of change of acceleration.

The processor may be further configured to determine that the preceding vehicle is traveling abnormally when the calculated distance between the lane line and the traveling trajectory of the preceding vehicle is greater than a predetermined distance.

The processor may be further configured to determine that the preceding vehicle is travelling abnormally when the rate of change of acceleration is greater than a predetermined rate of change.

The processor may be further configured to determine that the preceding vehicle is travelling abnormally when a speed of the preceding vehicle is lower by a predetermined value or more than a speed of an adjacent vehicle.

Furthermore, in accordance with embodiments of the present disclosure, a vehicle includes: a processor configured to calculate a direction in which the vehicle is to move in order to overtake a preceding vehicle and calculate a movement distance of the vehicle in the calculated direction in a lane on which the vehicle is currently travelling when it is determined that the preceding vehicle travels abnormally; a distance sensor configured to recognize a lane located in the calculated direction in which the vehicle is to move based on the calculated movement distance of the vehicle; and a driving apparatus configured to control driving of the vehicle according to the calculated movement distance.

The processor may be further configured to calculate a distance to the preceding vehicle, and the distance sensor may be further configured to recognize the lane located in the calculated direction based further on the calculated distance to the preceding vehicle.

The driving apparatus may be further configured to control driving of the vehicle in a manner which keeps the vehicle at or near the calculated distance to the preceding vehicle.

The processor may be further configured to calculate the distance to the preceding vehicle when a time until the vehicle collides with a rear vehicle traveling on the lane located in the calculated direction is shorter than a predetermined time.

The processor may be further configured to calculate the movement distance of the vehicle when a time until the vehicle collides with a rear vehicle traveling on the lane located in the calculated direction is longer than or equal to a predetermined time.

Furthermore, in accordance with embodiments of the present disclosure, a method of controlling a vehicle includes: calculating, by a processor, a direction in which the vehicle is to move in order to overtake a preceding vehicle when it is determined that the preceding vehicle is travelling abnormally; calculating, by the processor, a distance to the preceding vehicle when it is determined that the preceding vehicle is travelling abnormally; recognizing, by a distance sensor, a lane located in the calculated direction in which the vehicle is to move based on the calculated distance to the preceding vehicle; and controlling, by a driving apparatus, driving of the vehicle in a manner which keeps the vehicle at or near the calculated distance to the preceding vehicle.

The calculating of the distance to the preceding vehicle may include: calculating a time until the vehicle collides with a rear vehicle traveling on the lane located in the calculated direction; and calculating, the distance to the preceding vehicle when the calculated time is shorter than a predetermined time.

The method may further include: calculating a time until the vehicle collides with a rear vehicle traveling on the lane located in the calculated direction; calculating a movement distance of the vehicle in the decided direction in a lane on which the vehicle is currently travelling when the calculated time is longer than or equal to a predetermined time; and recognizing, by the distance sensor, a lane located in the calculated direction in which the vehicle is to move based further on the calculated movement distance.

The method may further include determining that the preceding vehicle is travelling abnormally when a speed of the preceding vehicle is lower by a predetermined value or more than a speed of an adjacent vehicle.

The method may further include determining that the preceding vehicle is travelling abnormally when a rate of change of acceleration is greater than a predetermined rate of change.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 9 is a flowchart illustrating a method of controlling a vehicle according to embodiments of the present disclosure.

Figure 1:
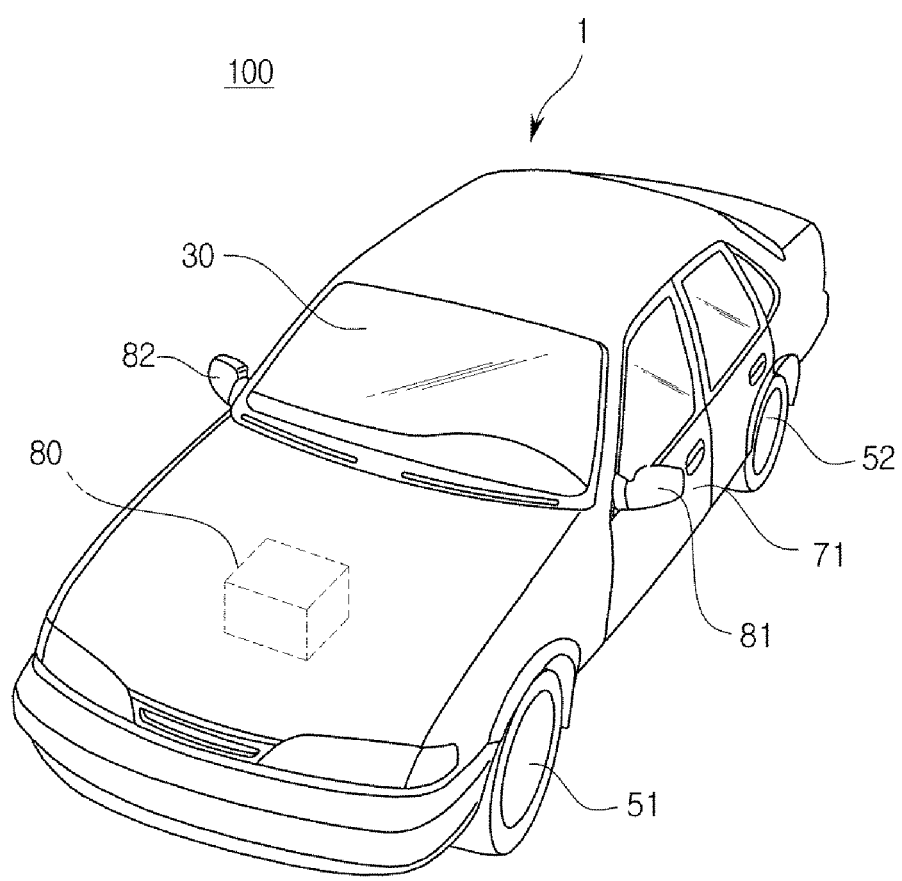
FIG. 1 shows an outer appearance of a vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Hereinafter, a vehicle and a method of controlling the vehicle, according to embodiments of the present disclosure, will be described in detail with reference to the accompanying drawings.

Figure 2:
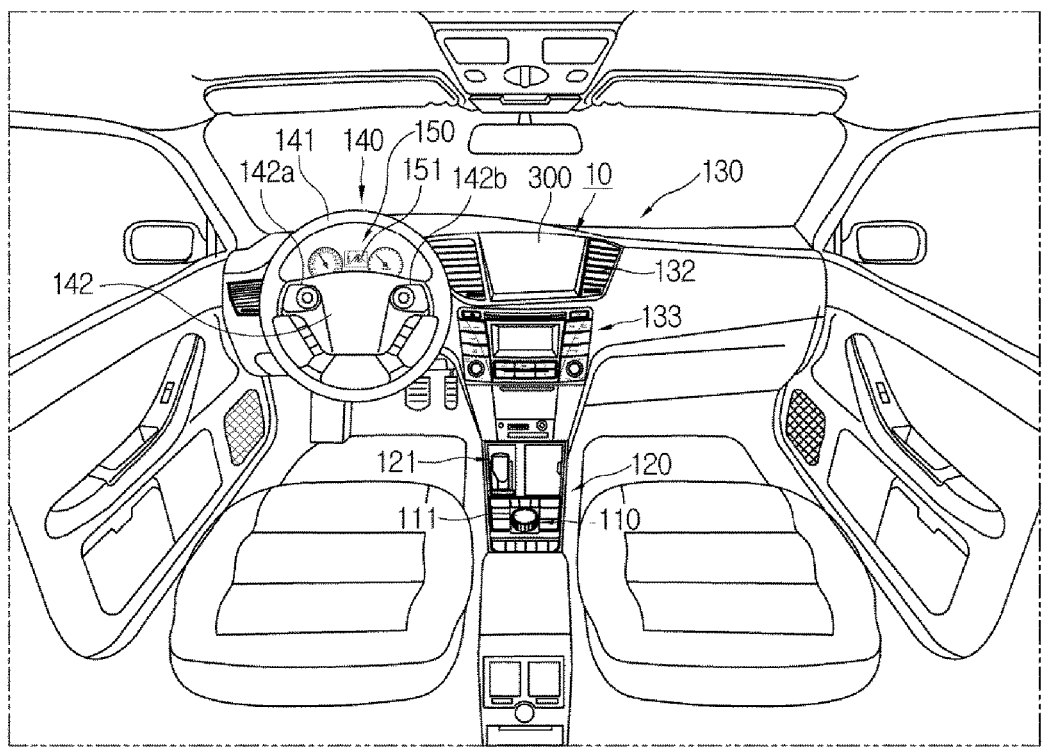
FIG. 2 shows an interior of a vehicle according to embodiments of the present disclosure.

FIG. 1 shows an outer appearance of a vehicle according to embodiments of the present disclosure, and FIG. 2 shows an interior of the vehicle according to embodiments of the present disclosure.

As shown in FIG. 1, a vehicle 100 according to embodiments of the present disclosure may include a main body 1 forming an outer appearance of the vehicle 100, a plurality of wheels 51 and 52 to move the vehicle 100, a driving apparatus 80 to control driving of the vehicle 100 by, e.g., rotating the wheels 51 and 52, a door 71 to shield the interior of the vehicle 100 from the outside, a front glass 30 to provide a driver inside the vehicle 100 with a front view of the vehicle 100, and a plurality of side-view mirrors 81 and 82 to provide the driver with rear views of the vehicle 10.

The wheels 51 and 52 may include front wheels 51 provided in the front part of the vehicle 10, and rear wheels 52 provided in the rear part of the vehicle 10.

The driving apparatus 80 may control driving of the vehicle 100 by providing rotary power to the front wheels 51 or the rear wheels 52 so that the main body 1 moves forward or backward. The driving apparatus 80 may adopt an engine to burn fossil fuel to produce rotary power, or a motor to receive power from a condenser (not shown) to produce rotary power.

The door 71 may be rotatably provided to the left and right of the main body 1 to allow the driver to open it and get into the vehicle 100. Also, the door 71 may shield the interior of the vehicle 100 from the outside when it closes.

The front glass 30 may be provided in the upper, front part of the main body 1 to allow the driver inside the vehicle 100 to acquire a front view of the vehicle 100. The front glass 30 is also called a windshield glass. Also, the side-view mirrors 81 and 82 may include a left side-view mirror 81 provided to the left of the main body 1 and a right side-view mirror 82 provided to the right of the main body 1 to allow the driver inside the vehicle 100 to check side and rear situations of the vehicle 100 with his/her eyes.

In addition, the vehicle 100 may include various sensors to sense an obstacle around the vehicle 100 in order to help the driver recognize the surroundings of the vehicle 100. Also, the vehicle 100 may include various sensors to sense driving information of the vehicle 100 such as the speed of the vehicle 100. Also, the vehicle may include a sensor to acquire images of the surroundings of the vehicle 100, such as lanes.

As shown in FIG. 2, the vehicle 100 may include a dashboard on which a gear box 120, a center fascia 130, a steering wheel 140, and an instrument panel 150 are installed.

The gear box 120 may include a gear lever 121 for shifting gears. Also, as shown in FIG. 2, the gear box 120 may include an input unit 110 including various buttons and a dial control unit 111 to allow a user to control functions of a multimedia system, such as a navigation system 10 or an audio system 133, or to control main functions of the vehicle 100.

On the center fascia 130, an air conditioner 132, the audio system 133, and the navigation system 10 may be installed.

The air conditioner 132 may adjust the inside temperature, humidity, air quality, and flow of air inside the vehicle 100 to maintain the inside of the vehicle 100 pleasant. The air conditioner 132 may be installed in the center fascia 130, and may include at least one vent for discharging air. In the center fascia 130, at least one button or dial for controlling the air conditioner 132, etc. may be provided. A user such as a driver may use the buttons or dial provided on the center fascia 130 to control the air conditioner 132 of the vehicle 100. Also, the user may control the air conditioner 132 through the buttons of the input unit 120 or the dial control unit 111 installed in the gear box 120.

According to embodiments of the present disclosure, the navigation system 10 may be mounted on the center fascia 130. The navigation system 10 may be embedded into the center fascia 130 of the vehicle 100. The center fascia 130 may include an input unit for controlling the navigation system 10. The input unit of the navigation system 10 may be installed at another location, not at the center fascia 130. For example, the input unit of the navigation system 10 may be installed around a display unit 300. In another example, the input unit of the navigation system 10 may be installed at the gear box 120.

The steering wheel 140 may be used to change the traveling direction of the vehicle 100. The steering wheel 140 may include a rim 141 that is gripped by the driver, and a spoke 142 connecting to a steering apparatus of the vehicle 100 and connecting the rim 31 to a hub of a rotation axis for steering. According to embodiments of the present disclosure, the spoke 142 may include a plurality of manipulation units 142a and 142b for controlling various devices (e.g., an audio system) of the vehicle 100. Also, the dashboard may further include various kinds of instrument panels 150 to display speed, revolutions per minute (RPM), and fuel gauge of the vehicle 100. The instrument panels 150 may include instrument panel display units 151 to display states of the vehicle 100, driving-related information, and information related to manipulations of the multimedia system.

The driver can drive the vehicle 100 by manipulating the above-described devices installed on the dashboard. The vehicle 100 may include various kinds of sensors to sense information about the surroundings of the vehicle 100 or driving information of the vehicle 100 required for driving of the vehicle 100, other than the devices that the driver can manipulate in order to drive the vehicle 100, as shown in FIG. 2.

The vehicle 100 can perform autonomous driving based on information sensed by the various kinds of sensors, without the driver's intervention. Upon autonomous driving, driving of the preceding vehicle is important. The reason is because the autonomous driving of the vehicle 100 can be controlled based on information about a distance to the preceding vehicle. Accordingly, when the preceding vehicle travels abnormally, for example, when the preceding vehicle often accelerates or decelerates, when the preceding vehicle travels in zigzags, or when the preceding vehicle travels slowly such that a difference in speed between the preceding vehicle and the adjacent vehicle is greater than or equal to a predetermined reference value, stability of autonomous driving may deteriorate. In this case, the vehicle 100 may be controlled to overtake the preceding vehicle. At this time, there may occur the case in which a distance sensor 307 (e.g., see FIG. 3) of the vehicle 100 fails to properly recognize a lane (hereinafter, referred to as an overtaking lane) to which the vehicle 100 is to move since a field of view (FOV) of the distance sensor 307 is screened by the preceding vehicle traveling on a lane on which the vehicle 100 travels currently or by another preceding vehicle traveling on the overtaking lane. For this reason, according to embodiments of the present disclosure, there are provided a vehicle capable of securing the FOV of the distance sensor 307 to overtake the preceding vehicle when the preceding vehicle travels abnormally, and a method of controlling the vehicle.

The embodiments of the present disclosure will be described in more detail with reference to FIGS. 3 to 8.

Figure 3:
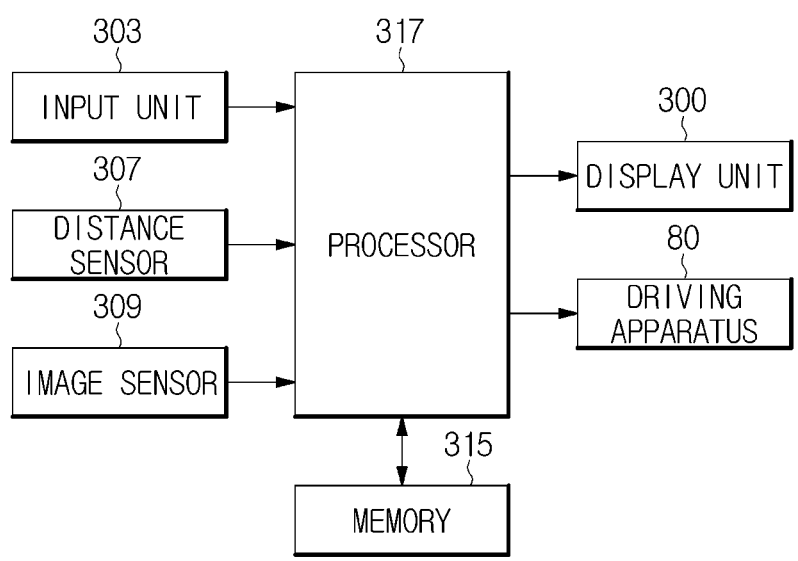
FIG. 3 is a control block diagram of a vehicle according to embodiments of the present disclosure.
Figure 4:
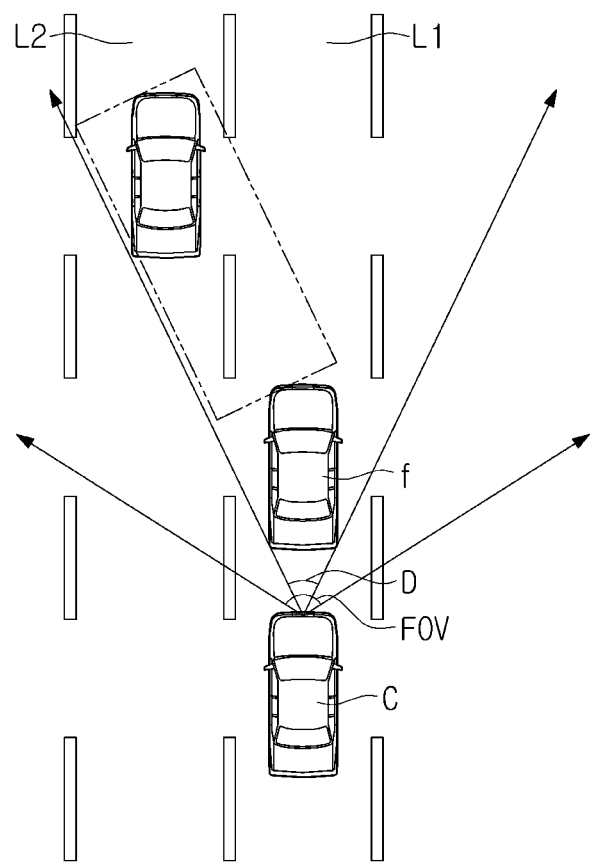
FIG. 4 conceptually shows a sensing range of a distance sensor of a vehicle.
Figure 5:
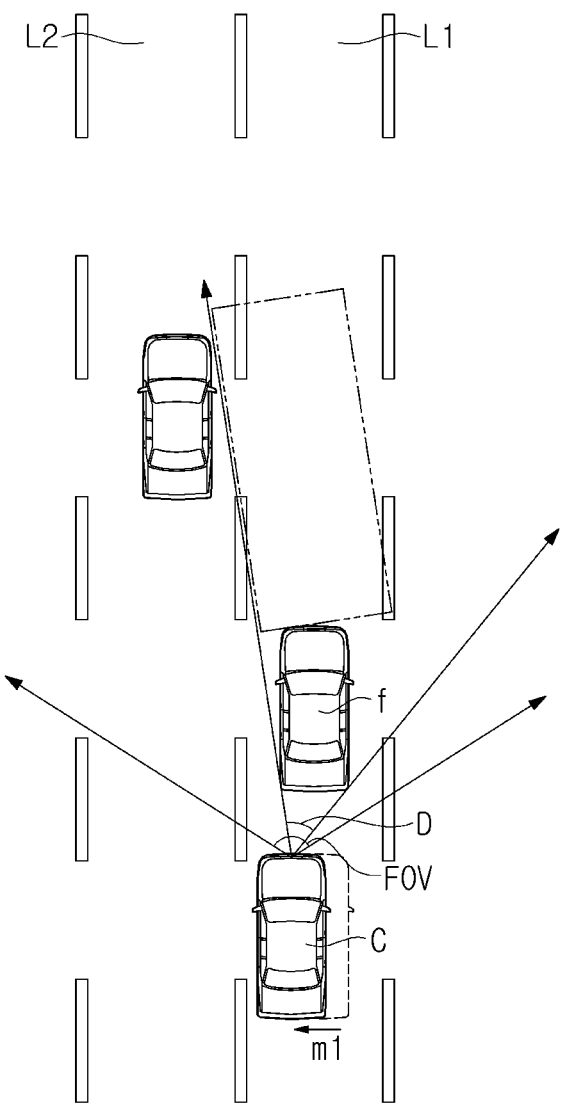
FIG. 5 is a view for conceptually describing a method of moving a vehicle according to embodiments of the present disclosure in a traversing direction so that a distance sensor can recognize an overtaking lane.
Figure 6:
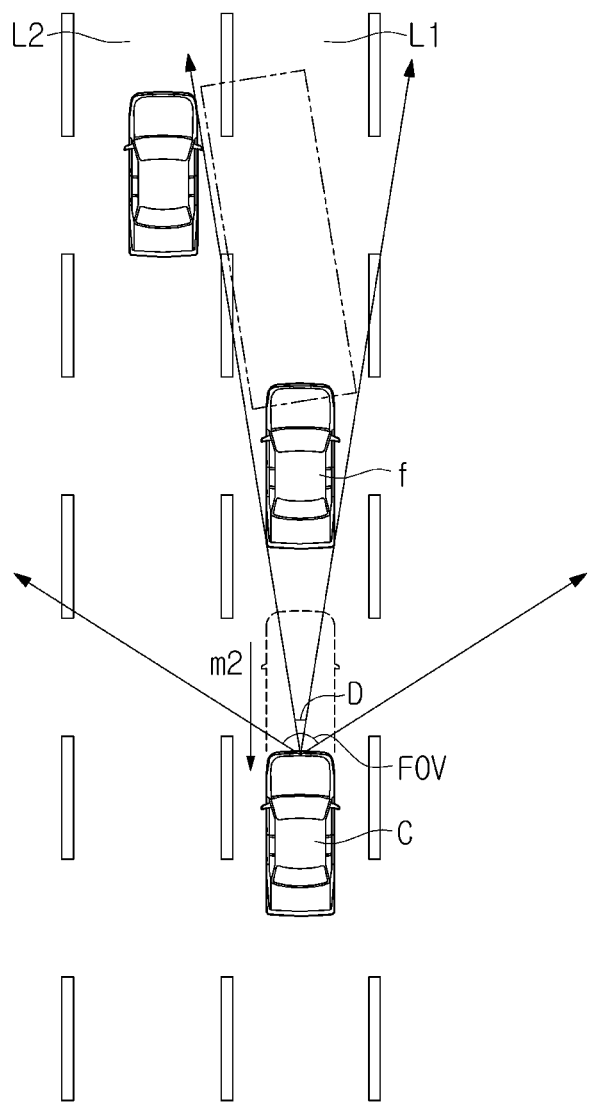
FIG. 6 is a view for conceptually describing a method of moving a vehicle according to embodiments of the present disclosure in an advancing direction so that a distance sensor can recognize an overtaking lane.
Figure 7:
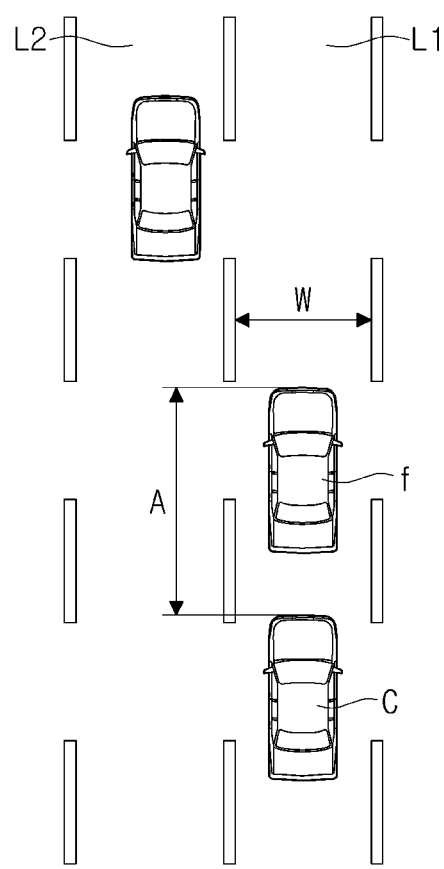
FIGS. 7 and 8 are views for describing information required for calculating a distance in order to move a vehicle according to embodiments of the present disclosure in an advancing direction and in a traversing direction.
Figure 8:
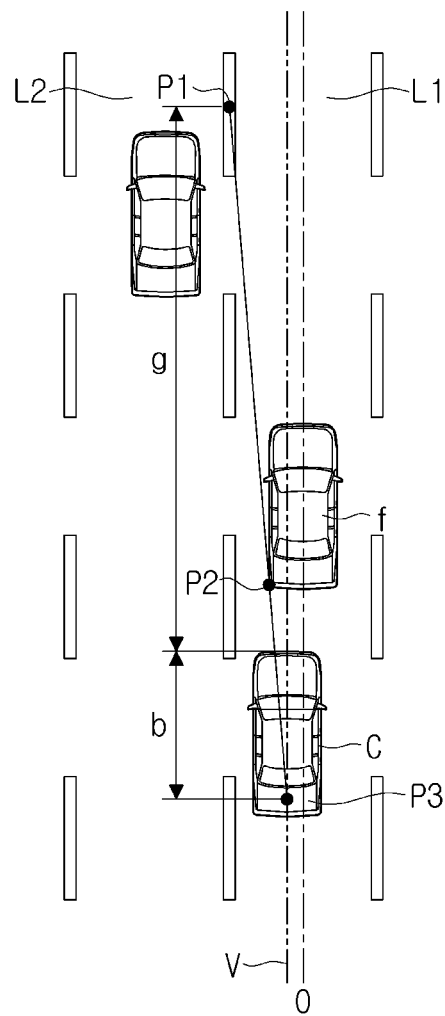

FIG. 3 is a control block diagram of a vehicle according to embodiments of the present disclosure, and FIG. 4 conceptually shows a sensing range of the distance sensor 307 of the vehicle. FIG. 5 is a view for conceptually describing a method of moving the vehicle according to embodiments of the present disclosure in the traversing direction so that the distance sensor 307 can recognize an overtaking lane, FIG. 6 is a view for conceptually describing a method of moving the vehicle according to embodiments of the present disclosure in the advancing direction so that the distance sensor 307 can recognize an overtaking lane, and FIGS. 7 and 8 are views for describing information required for calculating a distance in order to move the vehicle according to embodiments of the present disclosure in the advancing direction and in the traversing direction.

As shown in FIG. 3, the vehicle according to embodiments of the present disclosure may include an input unit 303 to receive an input for entering an autonomous driving mode, the distance sensor 307 to sense another vehicle or an obstacle ahead, an image sensor 309 to acquire images of the surroundings of the vehicle, a processor 317 to control the vehicle for autonomous driving based on information acquired by the distance sensor 307 and the image sensor 309, a display unit 300 to display various information related to driving of the vehicle, and a driving apparatus 80 to drive the vehicle according to the autonomous driving mode under the control of the processor 317.

The input unit 303 may be configured to allow a user to input a command for turning on the autonomous driving mode.

The input unit 303 may be disposed on a center fascia, a gear box, or a steering wheel. Also, the input unit 303 may be implemented in various hardware architectures, such as, for example, a hard key or soft key type button, a toggle switch, a dial, a voice recognition device, or a motion recognition device.

The input unit 303 may receive a user input of selecting one of the autonomous driving mode and a manual driving mode in which a driver drives himself/herself. That is, a driver who drives himself/herself in the manual driving mode may manipulate the input unit 303 to select the autonomous driving mode, or when the vehicle travels in the autonomous driving mode, the driver may select the manual driving mode to drive the vehicle himself/herself. When mode conversion between the autonomous driving mode and the manual driving mode occurs, the processor 317 may inform the driver that mode conversion occurs, through the display unit 300 or a speaker.

The distance sensor 307 may sense an object outside the vehicle, for example, a preceding vehicle traveling in front of the vehicle, a road, a fixed object such as a structure installed around a road, and another vehicle running on the opposing lane. The distance sensor 307 may sense signals reflected from the ground of a road or from lane lines marked on the road to calculate data including information about the ground of the road or lane information. The distance sensor 307 may be a radar or a light detection and ranging (i.e., lidar). For more accurate detection, the distance sensor 307 may be preferably a lidar. For the purposes of the present disclosure, the distance sensor 307 is assumed to be a multilayer lidar to emit multilayer laser vertically.

The image sensor 309 may acquire images of the surroundings of the vehicle, particularly, images of lines of a lane on which the vehicle travels, and transmit the acquired images to the processor 317. The image sensor 309 may include a front camera to acquire images of a front view of the vehicle, and may further include at least one of a left camera to acquire images of a left view of the vehicle, a right camera to acquire images of a right view of the vehicle, and a rear camera to acquire images of a rear view of the vehicle. The camera may include a Charge Coupled Devices (CCD) sensor or a Complementary Metal Oxide Semiconductors (CMOS) sensor.

If a command for selecting the autonomous driving mode is received through the input unit 303, or if a command for selecting a cruise control function is received through the input unit 303, the processor 317 may detect lane lines and decide a preceding vehicle f based on data calculated by the distance sensor 307 or images acquired by the image sensor 309. Alternatively, although no command for executing any one of the above-mentioned functions is received, the processor 317 may detect, when the vehicle is traveling, lane lines and decide a preceding vehicle f based on data calculated by the distance sensor 307 or images acquired by the image sensor 309. Also, the processor 317 may determine whether the preceding vehicle f is travelling abnormally, based on the data calculated by the distance sensor 307 or the images acquired by the image sensor 309.

The processor 317 may determine whether the preceding vehicle f travels abnormally in the advancing direction, based on a change in acceleration of the preceding vehicle f, and whether the preceding vehicle f travels abnormally in the traversing direction, based on distances between a traveling trajectory of the preceding vehicle f and lane lines. Then, the processor 317 may finally determine whether the preceding vehicle f travels abnormally, based on the determinations on whether the preceding vehicle f travels abnormally in the advancing direction and whether the preceding vehicle f travels abnormally in the traversing direction.

The processor 317 may calculate speed, acceleration, and/or a rate of change of acceleration of the preceding vehicle f, based on information sensed by the distance sensor 307. More specifically, in order to detect acceleration/deceleration of the preceding vehicle f, particularly, abrupt deceleration, frequent acceleration/deceleration, or excessively slow driving of the preceding vehicle f, the processor 317 may calculate speed, acceleration, and a rate of change of acceleration of the preceding vehicle f. The processor 317 may compare the speed, the acceleration, and the rate of change of acceleration to predetermined reference values, respectively, to determine whether the vehicle is travelling abnormally. Particularly, if the speed of the preceding vehicle f is lower by a predetermined value or more than the speed of the adjacent vehicle, the processor 317 may determine that the preceding vehicle f is travelling abnormally.

In order to calculate distances between a traveling trajectory of the preceding vehicle f and lane lines, the processor 317 may detect lines of a traveling lane L1 using information acquired by the image sensor 309. The processor 317 can more accurately detect the lines of the traveling lane L1 using information acquired by the distance sensor 307 and map information stored in the navigation system 10 (e.g., see FIG. 2) or a memory 315, as well as the information acquired by the image sensor 309. Also, the processor 317 may calculate the traveling trajectory of the preceding vehicle f based on the information sensed by the distance sensor 307. At this time, the processor 317 may use one of well-known algorithms to calculate the traveling trajectory of the preceding vehicle f. The processor 317 can more accurately calculate the traveling trajectory of the preceding vehicle f using the information acquired by the image sensor 309 and the map information stored in the navigation system 10 or the memory 315, as well as the information acquired by the distance sensor 307.

After detecting the lines of the traveling lane L1 and calculating the traveling trajectory of the preceding vehicle f, the processor 317 may calculate distances between the detected lines and the traveling trajectory of the preceding vehicle f. The processor 317 may compare the calculated distances to a predetermined reference value to determine whether the preceding vehicle f travels abnormally.

Then, the processor 317 may combine the results of the comparison between the distances and the predetermined reference value, with the results of the comparison between the speed-related information and the predetermined reference values to thus determine whether the preceding vehicle is travelling abnormally. That is, if the processor 317 determines that the preceding vehicle f is travelling abnormally in both the advancing direction and the traversing direction, the processor 317 may determine that the preceding vehicle f is traveling abnormally. Or, if the processor 317 determines that the preceding vehicle f is traveling abnormally in any one direction of the advancing direction and the traversing direction, the processor 317 may determine that the preceding vehicle f is travelling abnormally. Also, if the processor 317 determines that the preceding vehicle f is travelling excessively slowly, the processor 317 may determine that the preceding vehicle f is travelling abnormally.

If the processor 317 determines that the preceding vehicle f is travelling abnormally, the display unit 300 may display a message indicating that the preceding vehicle f is travelling abnormally to inform a driver that the preceding vehicle f is travelling abnormally. The message may be configured with a combination of text, an image, sound, etc. The display unit 300 may be the display unit 300 of the navigation system 10 or the display unit 151 of the instrument panel 150.

If the processor 317 determines that the preceding vehicle f is traveling abnormally, the processor 317 may perform control operation for overtaking the preceding vehicle f so that the vehicle can overtake the preceding vehicle f to travel on another lane.

In order for the vehicle to overtake the preceding vehicle f, the processor 317 may need to decide an overtaking lane L2. At this time, information (i.e., a sensed overtaking lane) acquired by the distance sensor 307 may be used. For example, when information acquired by the distance sensor 307 indicates that another vehicle travels on a lane (also, referred to as a right lane) located to the right of a lane on which the vehicle travels currently and no vehicle travels on a lane (also, referred to as a left lane) located to the left of the lane on which the vehicle travels currently, the processor 317 may determine the left lane as an overtaking lane based on the information acquired by the distance sensor 307, and perform control operation for overtaking the preceding vehicle f.

However, as shown in FIG. 4, if the entire or a part of a sensing area of the distance sensor 307 for sensing an overtaking lane is screened (hereinafter, the screened area will be referred to as a dead zone) by the preceding vehicle f traveling on the lane on which the vehicle travels currently or by another preceding vehicle traveling on the overtaking lane, the processor 317 cannot determine an overtaking lane or cannot stably perform control operation for overtaking the preceding vehicle f.

Accordingly, according to embodiments of the present disclosure, the vehicle may move in the traversing direction or the advancing direction to secure a sensing area of the distance sensor 307, as shown in FIGS. 5 and 6. This operation will be described in detail, as follows.

As shown in FIG. 4, the distance sensor 307 cannot accurately recognize the state of an overtaking lane, due to a dead zone D made in the sensing area of the distance sensor 307.

If the distance sensor 307 cannot accurately recognize the state of an overtaking lane due to such a dead zone D, the processor 317 may move the vehicle to include the overtaking lane in the sensing area of the distance sensor 307 so that the distance sensor 307 can sense the overtaking lane.

For example, as shown in FIG. 5, the processor 317 may move the vehicle in the lane on which the vehicle travels currently, in a direction which the vehicle is to move to overtake the preceding vehicle f, thereby including the overtaking lane in the sensing area of the distance sensor 307. Alternatively, as shown in FIG. 6, the processor 317 may increase the distance to the preceding vehicle f, thereby including the overtaking lane in the sensing area of the distance sensor 307. That is, if the processor 317 determines that the preceding vehicle f travels abnormally, the processor 317 may calculate a direction in which the vehicle needs to move in order to overtake the preceding vehicle f, and if a dead zone screening an overtaking lane located in the calculated direction is made in the sensing area of the distance sensor 307, the processor 317 may decide a direction in which the vehicle needs to move in order to secure the sensing area of the distance sensor 307.

If the processor 317 determines that a time to collision (TTC), i.e., a time until the vehicle collides, with a rear vehicle traveling on the overtaking lane is longer than or equal to a predetermined time, the processor 317 may calculate a movement distance in traversing direction of the vehicle for securing the sensing area of the distance sensor 307, and control the driving apparatus 80 according to the calculated movement distance to move the vehicle in the traversing direction in the lane on which the vehicle travels currently. The driving apparatus 80 may be an engine or a motor; however, the driving apparatus 80 may be any configuration that needs to be controlled upon autonomous driving of the vehicle.

If the vehicle moves in the traversing direction in the traveling lane, as shown in FIG. 5, the sensing area of the distance sensor 307 can be secured without having to lower the speed of the vehicle. However, since the driver can feel insecure by a rear vehicle traveling on the overtaking lane, a process of checking a TTC taken for the vehicle to collide with the rear vehicle traveling on the overtaking lane is performed. Also, in this case, lane lines need to be accurately recognized. If lane lines look blurred so that they cannot be accurately recognized, the vehicle may be controlled in the advancing direction in order to secure the sensing area of the distance sensor 307, which will be described later.

The movement distance in the traversing direction, as shown in FIG. 5, may be calculated by Equation (1) below.

$$m_1 = C*W/2 \quad (1)$$

In Equation (1), $m_1$ represents the movement distance in traversing direction of the vehicle, as shown in FIG. 5, C represents a degree of danger with respect to the movement in traversing direction, wherein C is a value between 0 and 1, and W represents a lane width. The degree of danger may be calculated based on a TTC taken for the vehicle to collide with the rear vehicle traveling on the overtaking lane. As the degree of danger is closer to 0, the movement in traversing direction has a greater degree of danger, and as the degree of danger is closer to 1, the movement in traversing direction has a smaller degree of danger.

Meanwhile, if the processor 317 determines that the TTC taken for the vehicle to collide with the rear vehicle traveling on the overtaking lane is shorter than the predetermined time, the processor 317 may calculate a distance to the preceding vehicle f in order to secure the sensing area of the distance sensor 307, and control the driving apparatus 80 to keep the vehicle at the calculated distance to the preceding vehicle f to thereby control movement in advancing direction of the vehicle, as shown in FIG. 6.

As shown in FIG. 6, when the processor 316 controls movement in advancing direction of the vehicle in order to keep the vehicle at the calculated distance to the preceding vehicle f, the processor 316 may need to reduce the speed of the vehicle. In this case, it is possible to lower a degree of danger with respect to the rear vehicle traveling on the overtaking lane.

In order to keep the vehicle at the calculated distance to the preceding vehicle f, the processor 317 may calculate a movement distance in advancing direction of the vehicle. As shown in FIG. 8, the processor 317 may extract a first point P1 existing on a line between the traveling lane L1 and the overtaking lane L2 among both lines of the traveling lane L1, and extract a second point P2 corresponding to the first point P1 and a corner of the rear bumper of the preceding vehicle f. Also, the processor 317 may set a virtual line V passing the vehicle in the advancing direction, and calculate a third point P3 that is an intersection of the virtual line V and a line connecting the first point P1 to the second point P2. Then, the processor 317 may calculate a distance b from the front bumper line of the vehicle to the third point P3, and calculate the distance b as a movement distance in advancing direction of the vehicle for keeping the vehicle at the calculated distance to the preceding vehicle f.

The first point P1 may be calculated as a point on the line between the traveling lane and the overtaking lane, which is spaced a distance g to the preceding vehicle traveling on the overtaking lane from the front bumper line of the vehicle. The distance g to the preceding vehicle traveling on the overtaking lane for recognizing the overtaking lane may be calculated by Equation (2) below.

$$g = \alpha v_f + K \quad (2)$$

In Equation (2), g represents the distance to the preceding vehicle traveling on the overtaking lane, required for the distance sensor 307 to recognize the overtaking lane, $v_f$ represents the speed of the preceding vehicle, K is a distance value obtained by adding the length of the vehicle to a distance A shown in FIG. 7, and $\alpha$ is a constant for matching a unit of speed of the preceding vehicle with a unit of distance.

The processor 317 may control movement in advancing direction of the vehicle based on the calculated movement distance in advancing direction, thereby securing the sensing area of the distance sensor 307 for sensing an overtaking lane.

Meanwhile, as described above, when the processor 317 moves the vehicle in the traversing direction in the traveling lane since the TTC taken for the vehicle to collide with the rear vehicle traveling on the overtaking lane is longer than or equal to the predetermined time, the processor 317 may also move the vehicle in the advancing direction. That is, when the TTC taken for the vehicle to collide with the rear vehicle traveling on the overtaking lane is longer than or equal to the predetermined time, the processor 317 may perform control operation of moving the vehicle in the traversing direction, as shown in FIG. 5, or the processor 317 may perform control operation of moving the vehicle in the advancing direction, as shown in FIG. 6, while moving the vehicle in the traversing direction, in order to more efficiently secure the sensing area of the distance sensor 307 for sensing the overtaking lane.

FIG. 9 is a flowchart illustrating a method of controlling the vehicle according to embodiments of the present disclosure.

As shown in FIG. 9, the processor 317 may determine whether a preceding vehicle travels abnormally, in operation 800. If the processor 317 determines that the preceding vehicle travels abnormally, the processor 317 may determine whether a TTC taken for the vehicle to collide (i.e., a time until the vehicle collides) with a rear vehicle traveling on an overtaking lane is shorter than a predetermined time, in operation 810. If the processor 317 determines that the TTC taken for the vehicle to collide with the rear vehicle traveling on the overtaking lane is shorter than the predetermined time, the processor 317 may decide a distance to the preceding vehicle for recognizing the overtaking lane, in operation 820, and keep the vehicle at the decided distance to the preceding vehicle, in operation 830.

The processor 317 may determine whether the preceding vehicle travels abnormally in the advancing direction, based on a change in acceleration of the preceding vehicle, and may determine whether the preceding vehicle travels abnormally in the traversing direction, based on distances between a traveling trajectory of the preceding vehicle and lane lines. Then, the processor 317 may finally determine whether the vehicle travels abnormally, based on the result of the determination on whether the vehicle travels abnormally in the advancing direction or whether the vehicle travels abnormally in the traversing direction. If the processor 317 determines that the vehicle travels abnormally in the advancing direction or that the vehicle travels abnormally in the traversing direction, the processor 317 may determine that the preceding vehicle travels abnormally. Also, as described above, if the processor 317 determines that the preceding vehicle is traveling excessively slowly, the processor 317 may determine that the preceding vehicle is traveling abnormally. This operation has been described above, and accordingly, a detailed description thereof will be omitted.

If the processor 317 determines that the preceding vehicle travels abnormally, the processor 317 may determine control operation for overtaking the preceding vehicle so that the vehicle can overtake the preceding vehicle to travel on another lane.

As shown in FIG. 4, if a dead zone is made in a sensing range of the distance sensor 307, the distance sensor 307 cannot accurately recognize the state of the overtaking lane.

If the distance sensor 307 cannot recognize the overtaking lane due to the dead zone, the processor 317 may move the vehicle to include the overtaking lane in the sensing area of the distance sensor 307 so that the distance sensor 307 can sense the overtaking lane. For example, the processor 317 may increase the distance to the preceding vehicle to thereby include the overtaking lane in the sensing area of the distance sensor 307, as shown in FIG. 6.

That is, if the processor 317 determines that the preceding vehicle travels abnormally, the processor 317 may calculate a direction in which the vehicle needs to move in order to overtake the preceding vehicle, and if a dead zone screening an overtaking lane located in the calculated direction is made in the sensing area of the distance sensor 307, the processor 317 may decide a direction in which the vehicle needs to move in order to secure the sensing area of the distance sensor 307.

If the processor 317 determines that a TTC taken for the vehicle to collide with a rear vehicle traveling on the overtaking lane is shorter than a predetermined time, the processor 317 may calculate a distance g to the preceding vehicle for securing the sensing area of the distance sensor 307, and control movement in advancing direction of the vehicle in order to keep the vehicle at the calculated distance g to the preceding distance, as shown in FIG. 6.

When the processor 317 controls movement in advancing direction of the vehicle in order to keep the vehicle at the calculated distance g to the preceding vehicle, as shown in FIG. 6, the processor 317 may need to reduce the speed of the vehicle, which can reduce a degree of danger with respect to the rear vehicle traveling on the overtaking lane.

The processor 317 may calculate a movement distance in advancing direction of the vehicle in order to keep the vehicle at the calculated distance g to the preceding vehicle. As shown in FIG. 8, the processor 317 may extract a first point P1 existing on a line between the traveling lane and the overtaking lane among both lines of the traveling lane, and extract a second point P2 corresponding to the first point P1 and a corner of the rear bumper of the preceding vehicle f. Also, the processor 317 may set a virtual line V passing the vehicle in the advancing direction, and decide a third point P3 that is an intersection of the virtual line V and a line connecting the first point P1 to the second point P2. The processor 317 may calculate a distance from the front bumper line of the vehicle to the third point P3, and calculate the distance as a movement distance in advancing direction of the vehicle for keeping the vehicle at the calculated distance to the preceding vehicle.

The first distance P1 may be decided as a point on the line between the traveling lane and the overtaking lane, which is spaced a distance to the preceding vehicle traveling on the overtaking lane from the front bumper line of the vehicle. The distance to the preceding vehicle traveling on the overtaking lane for recognizing the overtaking lane may be calculated by Equation (2) as expressed above.

The processor 317 may control traveling in advancing direction of the vehicle based on the calculated movement distance in advancing direction, thereby securing the sensing area of the distance sensor 307 for recognizing the overtaking lane Meanwhile, if the processor 317 determines that the TTC taken for the vehicle to collide with the rear vehicle traveling on the overtaking lane is longer than or equal to the predetermined time, the processor 317 may decide a movement distance in traversing direction of the vehicle toward the overtaking lane in a lane on which the vehicle travels currently, in operation 840, calculate a distance to the preceding vehicle for recognizing the overtaking lane, in operation 850, and control movement in traversing direction and movement in advancing direction of the vehicle based on the movement distance in traversing direction and the distance to the preceding vehicle, in operation 860.

If the CCT taken for the vehicle to collide with the rear vehicle traveling on the overtaking lane is longer than or equal to the predetermined time, the processor 317 may calculate a movement distance in traversing direction of the vehicle for ensuring the sensing area of the distance sensor 307, and move the vehicle in the traversing direction in the lane on which the vehicle travels currently, based on the calculated movement distance, as shown in FIG. 5.

If the vehicle moves in the traversing direction in the traveling lane, as shown in FIG. 5, the sensing area of the distance sensor 307 can be secured without having to lower the speed of the vehicle. However, since the driver can feel insecure by the rear vehicle traveling on the overtaking lane, a process of determining a TTC taken for the vehicle to collide with the rear vehicle traveling on the overtaking lane is performed. The movement distance in traversing direction, as shown in FIG. 5, may be calculated by Equation (1) expressed above. A method of deciding the distance to the preceding vehicle is the same as that described above in operations 820 to 830, and accordingly, a detailed description thereof will be omitted.

In order to control movement in traversing direction of the vehicle, lane lines need to be accurately recognized. If lane lines look blurred so that they cannot be accurately recognized, the vehicle may be controlled only in the advancing direction in order to secure the sensing area of the distance sensor 307.

The processor 317 may control traveling in traversing direction and advancing direction of the vehicle based on the movement distance in the traversing direction and the movement distance in the advancing direction, thereby securing the sensing area of the distance sensor 307 for recognizing an overtaking lane.

In the vehicle and the method of controlling the vehicle, according to the embodiments of the present disclosure, when the preceding vehicle travels abnormally, the vehicle can stably overtake the preceding vehicle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
a processor configured to calculate a direction in which the vehicle is to move in order to overtake a preceding vehicle and calculate a distance to the preceding vehicle when it is determined that the preceding vehicle is travelling abnormally;
a distance sensor configured to recognize a lane located in the calculated direction in which the vehicle is to move based on the calculated distance to the preceding vehicle; and
a driving apparatus being an engine or a motor configured to control driving of the vehicle in a manner which keeps the vehicle at or near the calculated distance to the preceding vehicle,
wherein the processor is further configured to calculate a movement distance of the vehicle when a time until the vehicle collides with a rear vehicle traveling on the lane located in the calculated direction is greater than or equal to a predetermined time, and
wherein the processor is further configured to calculate the distance to the preceding vehicle when the time until the vehicle collides with the rear vehicle traveling on the lane located in the calculated direction is less than a predetermined time.

2. The vehicle according to claim 1, wherein:
the processor is further configured to calculate the movement distance of the vehicle in the calculated direction in a lane on which the vehicle is currently travelling, and
the distance sensor is further configured to recognize the lane located in the calculated direction based further on the calculated movement distance.

3. The vehicle according to claim 2, wherein the driving apparatus is further configured to control driving of the vehicle according to the calculated movement distance.

4. The vehicle according to claim 1, further comprising:
an image sensor configured to acquire an image of surroundings of the vehicle,
wherein the processor is further configured to calculate a distance between a lane line and a traveling trajectory of the preceding vehicle or a rate of change of acceleration of the preceding vehicle based on information acquired by at least one of the distance sensor and the image sensor and determine whether the preceding vehicle is travelling abnormally based on the calculated distance between the lane line and the traveling trajectory of the preceding vehicle or rate of change of acceleration.

5. The vehicle according to claim 4, wherein the processor is further configured to determine that the preceding vehicle is traveling abnormally when the calculated distance between the lane line and the traveling trajectory of the preceding vehicle is greater than a predetermined distance.

6. The vehicle according to claim 4, wherein the processor is further configured to determine that the preceding vehicle is travelling abnormally when the rate of change of acceleration is greater than a predetermined rate of change.

7. The vehicle according to claim 1, wherein the processor is further configured to determine that the preceding vehicle is travelling abnormally when a speed of the preceding vehicle is lower by a predetermined value or more than a speed of an adjacent vehicle.

8. A vehicle comprising:
a processor configured to calculate a direction in which the vehicle is to move in order to overtake a preceding vehicle and calculate a movement distance of the vehicle in the calculated direction in a lane on which the vehicle is currently travelling when it is determined that the preceding vehicle travels abnormally;
a distance sensor configured to recognize a lane located in the calculated direction in which the vehicle is to move based on the calculated movement distance of the vehicle; and
a driving apparatus being an engine or a motor configured to control driving of the vehicle according to the calculated movement distance,
wherein the processor is further configured to calculate the movement distance of the vehicle when a time until the vehicle collides with a rear vehicle traveling on the lane located in the calculated direction is greater than or equal to a predetermined time.

9. The vehicle according to claim 8, wherein:
the processor is further configured to calculate a distance to the preceding vehicle, and
the distance sensor is further configured to recognize the lane located in the calculated direction based further on the calculated distance to the preceding vehicle.

10. The vehicle according to claim 9, wherein the driving apparatus is further configured to control driving of the vehicle in a manner which keeps the vehicle at or near the calculated distance to the preceding vehicle.

11. The vehicle according to claim 9, wherein the processor is further configured to calculate the distance to the preceding vehicle when a time until the vehicle collides with a rear vehicle traveling on the lane located in the calculated direction is shorter than a predetermined time.

12. A method of controlling a vehicle, comprising:
calculating, by a processor, a direction in which the vehicle is to move in order to overtake a preceding vehicle when it is determined that the preceding vehicle is travelling abnormally;
calculating, by the processor, a distance to the preceding vehicle when it is determined that the preceding vehicle is travelling abnormally;
recognizing, by a distance sensor, a lane located in the calculated direction in which the vehicle is to move based on the calculated distance to the preceding vehicle; and
controlling, by a driving apparatus, driving of the vehicle in a manner which keeps the vehicle at or near the calculated distance to the preceding vehicle,
wherein calculating the distance to the preceding vehicle comprises:
calculating a time until the vehicle collides with a rear vehicle traveling on the lane located in the calculated direction;
calculating the distance to the preceding vehicle when the calculated time is shorter than a predetermined time;
calculating a movement distance of the vehicle in the decided direction in a lane on which the vehicle is currently travelling when the calculated time is greater than or equal to the predetermined time; and
recognizing, by the distance sensor, the lane located in the calculated direction in which the vehicle is to move based further on the calculated movement distance.

13. The method according to claim 12, further comprising:
determining that the preceding vehicle is travelling abnormally when a speed of the preceding vehicle is lower by a predetermined value or more than a speed of an adjacent vehicle.

14. The method according to claim 12, further comprising:
determining that the preceding vehicle is travelling abnormally when a rate of change of acceleration is greater than a predetermined rate of change.

* * * * *